(12) United States Patent
Liu et al.

(10) Patent No.: US 11,876,856 B2
(45) Date of Patent: Jan. 16, 2024

(54) METHOD FOR COMPUTATIONAL-POWER SHARING AND RELATED DEVICE

(71) Applicant: SPREADTRUM SEMICONDUCTOR (NANJING) CO., LTD., Jiangsu (CN)

(72) Inventors: Yingying Liu, Jiangsu (CN); Runquan Miao, Jiangsu (CN); Chunhui Zhu, Jiangsu (CN); Ming Sun, Jiangsu (CN)

(73) Assignee: SPREADTRUM SEMICONDUCTOR (NANJING) CO., LTD., Jiangsu (CN)

( * ) Notice: Subject to any disclaimer, the term of this patent is extended or adjusted under 35 U.S.C. 154(b) by 0 days.

(21) Appl. No.: 17/918,464

(22) PCT Filed: Apr. 13, 2021

(86) PCT No.: PCT/CN2021/086931
§ 371 (c)(1),
(2) Date: Oct. 12, 2022

(87) PCT Pub. No.: WO2021/208915
PCT Pub. Date: Oct. 21, 2021

(65) Prior Publication Data
US 2023/0144062 A1 May 11, 2023

(30) Foreign Application Priority Data
Apr. 13, 2020 (CN) .......................... 202010288252.4

(51) Int. Cl.
*H04L 67/10* (2022.01)
*H04L 67/60* (2022.01)
(Continued)

(52) U.S. Cl.
CPC ............ *H04L 67/10* (2013.01); *G06F 9/5027* (2013.01); *H04L 65/40* (2013.01); *H04L 67/60* (2022.05)

(58) Field of Classification Search
CPC ......... H04L 67/10; H04L 65/40; H04L 67/60; G06F 9/5027; G06F 9/50; Y02D 10/00
See application file for complete search history.

(56) References Cited

U.S. PATENT DOCUMENTS 6,463,457 B1 * 10/2002 Armentrout .......... G06F 9/5072
709/201
2012/0198073 A1 * 8/2012 Srikanth .................. H04L 67/10
709/226
(Continued)

FOREIGN PATENT DOCUMENTS

CN  108874526 A  11/2018
CN  108985937 A  12/2018
(Continued)

OTHER PUBLICATIONS

Lei Bo et al. Computing network: a new multi-access edge computing.
(Continued)

*Primary Examiner* — Cheikh T Ndiaye
(74) *Attorney, Agent, or Firm* — Dave Law Group LLC; Raj S. Dave

(57) ABSTRACT

A method for computational-power sharing is provided. In implementations of the disclosure, a computational-power sharing network element is connected with a network to perform control plane transmission and data plane transmission, or the computational-power sharing network element is connected with the network to perform control plane transmission. The computational-power sharing network element acquires computational-power demand information transmitted by a computing demand side and available computational-power information transmitted by at least one computing cooperation side. The computational-power sharing network element determines a computing cooperation side from the at least one computing cooperation side according (Continued)

to the computational-power demand information and the available computational-power information, and directly or indirectly indicates the computing cooperation side to complete a computing task of the computing demand side, where the computing cooperation side is able to provide computational power for the computing demand side.

18 Claims, 8 Drawing Sheets

(51) Int. Cl.
  *G06F 9/50* (2006.01)
  *H04L 65/40* (2022.01)

(56) References Cited

U.S. PATENT DOCUMENTS

2019/0012212 A1\* 1/2019 Lewis .................. G06F 9/5044

2019/0379734 A1 12/2019 Zavesky et al.
2020/0076884 A1 3/2020 Li et al.

FOREIGN PATENT DOCUMENTS

| | | |
|---|---|---|
| CN | 109242637 A | 1/2019 |
| CN | 109769207 A | 5/2019 |
| CN | 109818868 A | 5/2019 |
| CN | 110225129 A | 9/2019 |
| CN | 110231987 A | 9/2019 |
| CN | 110782343 A | 2/2020 |
| CN | 110851529 A | 2/2020 |
| CN | 110928685 A | 3/2020 |

OTHER PUBLICATIONS

The first office action issued in corresponding CN application No. 202010288252.4 dated Sep. 21, 2022.
WIPO, International Search Report and Written Opinion for International Application No. PCT/CN2021/086931, dated Jul. 2, 2021.

\* cited by examiner

METHOD FOR COMPUTATIONAL-POWER SHARING AND RELATED DEVICE

CROSS-REFERENCE TO RELATED APPLICATION(S)

This application is a National Stage of International Application No. PCT/CN2021/086931, filed Apr. 13, 2021, which claims priority to Chinese Patent Application No. 202010288252.4, filed Apr. 13, 2020, the entire disclosures of which are hereby incorporated by reference.

TECHNICAL FIELD

The disclosure relates to the field of computing technology, and more particularly to a method for computational-power sharing and related devices.

BACKGROUND

With the advent of the big data era, computational power becomes an important productivity in the digital economy era. During continuous breakthroughs in emerging technologies, computational power, as a "fuel" that drives technological progress, has become an emerging "energy".

In the related art, it needs to use huge computing power to complete some applications, and it may take a considerable time if centralized computing is adopted, which is an urgent technical problem to-be-solved.

SUMMARY

A method for computational-power sharing and related devices are provided in implementations of the disclosure.

A method for computational-power sharing is provided in a first aspect of implementations of the disclosure. The method is applied to a computational-power sharing network element, where the computational-power sharing network element is connected with a network to perform control plane transmission and data plane transmission, or the computational-power sharing network element is connected with the network to perform control plane transmission. The method includes the following. Acquire computational-power demand information transmitted by a computing demand side and available computational-power information transmitted by at least one computing cooperation side. Determine a computing cooperation side from the at least one computing cooperation side according to the computational-power demand information and the available computational-power information, and directly or indirectly indicate the computing cooperation side to complete a computing task of the computing demand side, where the computing cooperation side is able to provide computational power for the computing demand side.

A computational-power sharing network element is provided in a second aspect of implementations of the disclosure. The computational-power sharing network element is connected with a network to perform control plane transmission and data plane transmission, or the computational-power sharing network element is connected with the network to perform control plane transmission. The computational-power sharing network element includes a transceiver, a processor, and a memory storing computer programs. The computer programs are executed by the processor to cause the transceiver to acquire computational-power demand information transmitted by a computing demand side and available computational-power information transmitted by at least one computing cooperation side. The computer programs are further executed by the processor to cause the processor to determine a computing cooperation side from the at least one computing cooperation side according to the computational-power demand information and the available computational-power information, and directly or indirectly indicate the computing cooperation side to complete a computing task of the computing demand side, where the computing cooperation side is able to provide computational power for the computing demand side.

A non-transitory computer storage medium is provided in a third aspect of implementations of the disclosure. The computer storage medium is configured to store computer programs, where the computer programs include program instructions which, when executed by a processor, are operable with the processor to perform the method for computational-power sharing in the first aspect. The computer programs are executed by a computational-power sharing network element. The computational-power sharing network element is connected with a network to perform control plane transmission and data plane transmission, or the computational-power sharing network element is connected with the network to perform control plane transmission. The computer programs are executed by the computational-power sharing network element to perform the following. Acquire computational-power demand information transmitted by a computing demand side and available computational-power information transmitted by at least one computing cooperation side. Determine a computing cooperation side from the at least one computing cooperation side according to the computational-power demand information and the available computational-power information, and directly or indirectly indicate the computing cooperation side to complete a computing task of the computing demand side, where the computing cooperation side is able to provide computational power for the computing demand side.

BRIEF DESCRIPTION OF THE DRAWINGS

In order to describe technical solutions in implementations of the disclosure more clearly, the following will give a brief introduction to accompanying drawings required for describing implementations. Apparently, the accompanying drawings hereinafter described are some implementations of the disclosure. Based on these drawings, those of ordinary skill in the art can also obtain other drawings without creative effort.

DETAILED DESCRIPTION

The following will illustrate clearly and completely technical solutions in implementations of the disclosure with reference to the accompanying drawings of implementations of the disclosure.

It can be understood that, The terms "first", "second", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can also be included either.

The term "embodiment" or "implementation" referred to herein means that a particular feature, structure, or feature described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

In the related art, a computing task with a huge computation load cannot be quickly completed due to limited computational power of a single computing body, therefore a method for computational-power sharing is provided in the disclosure, which can realize computational-power sharing, thereby quickly completing a computing task.

In the disclosure, a computing demand side may be any carrier that requires computational-power services or can provide computational-power services, such as an intelligent agent, a user equipment (UE), a computing server, a base station, etc. A computing cooperation side may be any carrier that requires computational-power services or can provide computational-power services, such as an intelligent agent, a UE, a computing server, a base station, etc. The computing demand side has a unique identifier (ID) and the computing cooperation side has a unique ID, where each ID may be a sequence that consists of at least one of a number, a letter, or a special character. The 3rd generation partnership project (3GPP) connection can be established between the computing demand side and the computing cooperation side to perform data transmission.

Figure 1A:
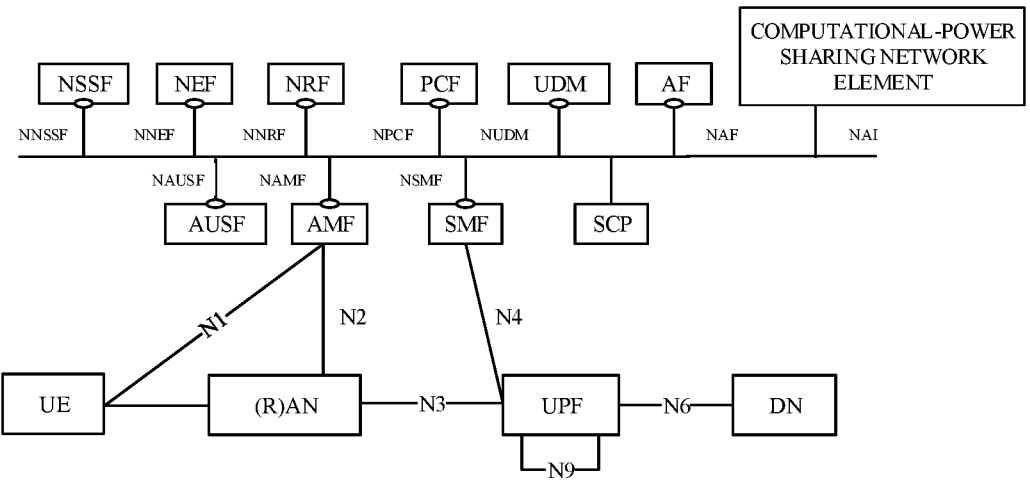
FIG. 1A is a schematic diagram illustrating a connection between a computational-power sharing network element and a core network provided in implementations of the disclosure.

A method for computational-power sharing is provided in the disclosure. The method is applied to a computational-power sharing network element, where the computational-power sharing network element is connected with a network, and the network includes a core network. The computational-power sharing network element is a new network element for computational-power sharing in the core network and is an entity deployed by an operator. The computational-power sharing network element is connected with the core network. Refer to FIG. 1A, which is a schematic diagram illustrating a connection between a computational-power sharing network element and a core network provided in implementations of the disclosure. The computational-power sharing network element is connected with interfaces of other network elements in the core network through a newly-added fourth interface such as north Atlantic industries (Nai) interface, to realize interaction with the other network elements in the core network.

Figure 1B:
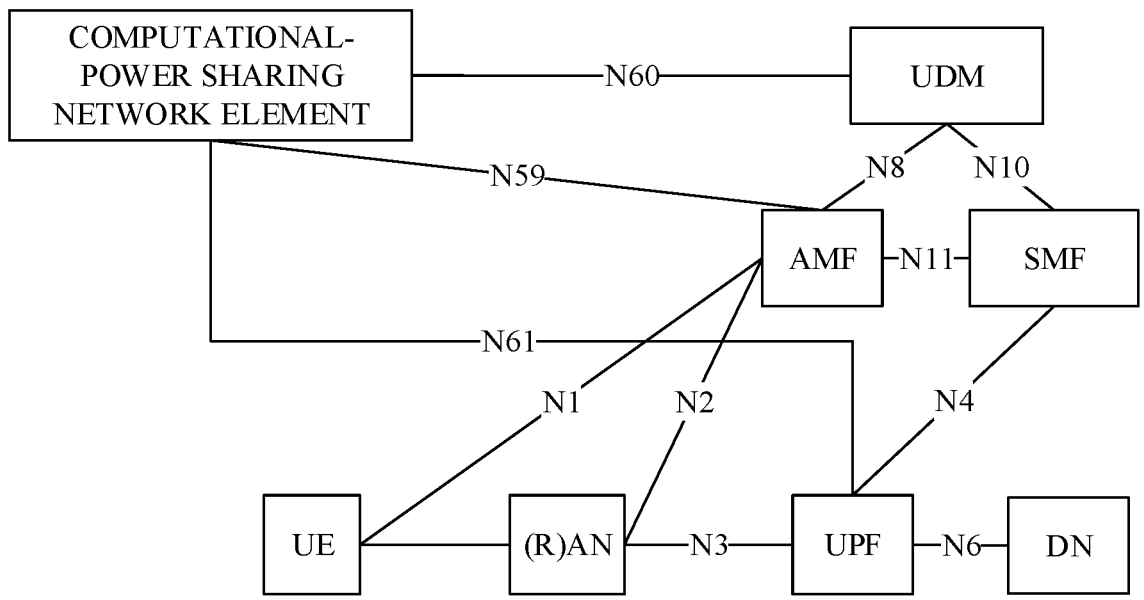
FIG. 1B is a schematic diagram illustrating connections between a computational-power sharing network element and reference points of a core network provided in implementations of the disclosure.
Figure 1C:
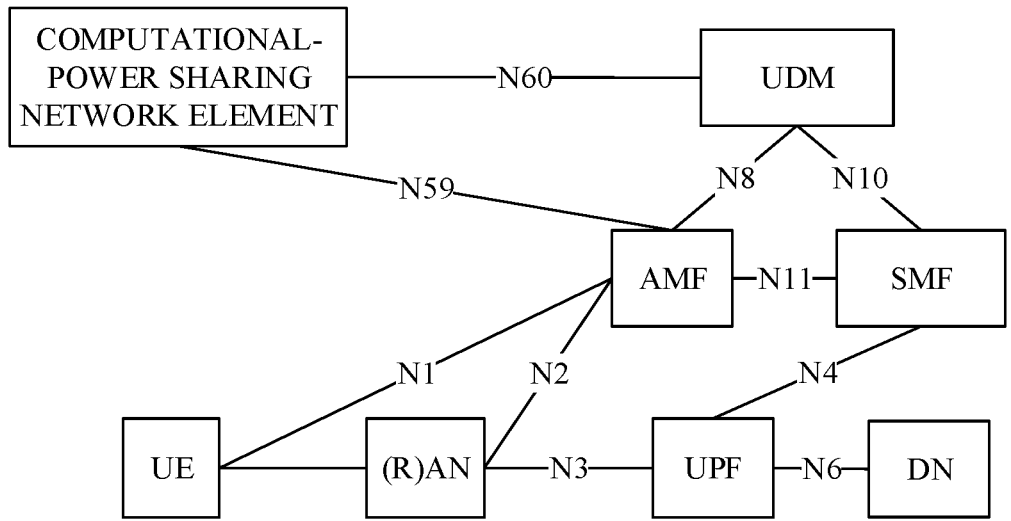
FIG. 1C is a schematic diagram illustrating connections between a computational-power sharing network element and reference points of a core network provided in implementations of the disclosure.

In a possible implementation, referring to FIG. 1B and FIG. 1C, FIG. 1B and FIG. 1C are schematic diagrams illustrating connections between a computational-power sharing network element and reference points of a core network provided in implementations of the disclosure. In FIG. 1B, the computational-power sharing network element is connected with the core network to perform control plane transmission and data plane transmission. Specifically, the computational-power sharing network element interacts with a unified data management (UDM) network element through a newly-added first reference point N60, and the computational-power sharing network element interacts with an access and mobility management function (AMF) network element through a newly-added second reference point N59, thereby realizing control plane transmission, and thus the computational-power sharing network element has a scheduling capacity. However, the computational-power sharing network element interacts with a user plane function (UPF) network element through a newly-added third reference point N61, thereby realizing data plane transmission. That is, the computational-power sharing network element can realize large data volume transmission with other terminal devices, such as training model transmission or training set transmission, and the computational-power sharing network element has an information integration capacity.

In another possible implementation, referring to FIG. 1C, the computational-power sharing network element is connected with the core network to perform control plane transmission. Specifically, the computational-power sharing network element interacts with the UDM network element through the newly-added first reference point N60, and the computational-power sharing network element interacts with the AMF network element through the newly-added second reference point N59, thereby realizing control plane transmission, and thus the computational-power sharing network element has a scheduling capacity.

Figure 2:
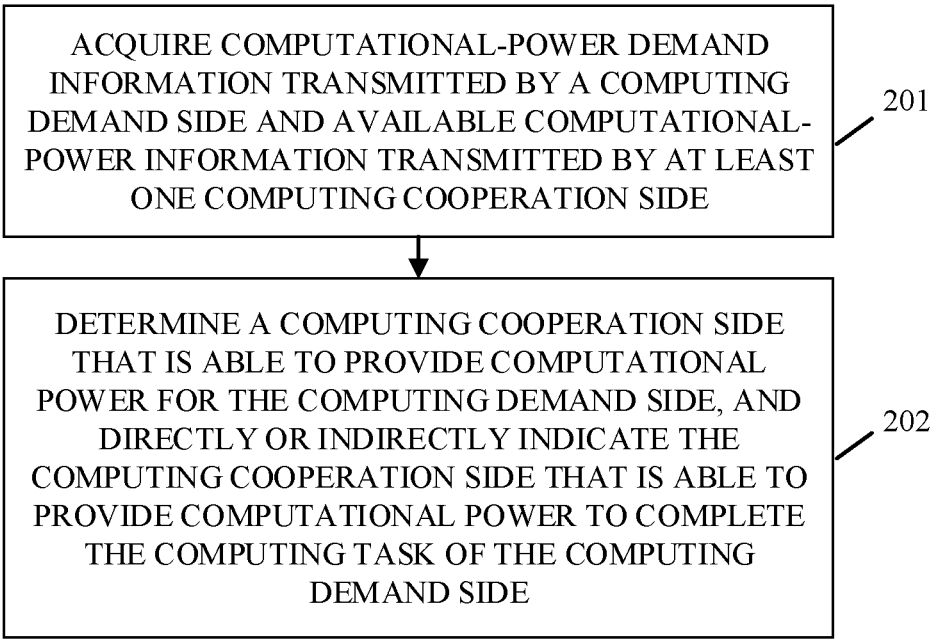
FIG. 2 is a schematic flow chart illustrating a method for computational-power sharing provided in implementations of the disclosure.

Referring to FIG. 2, FIG. 2 is a schematic flow chart illustrating a method for computational-power sharing provided in implementations of the disclosure. The method for computational-power sharing includes the following.

At 201, acquire computational-power demand information transmitted by a computing demand side and available computational-power information transmitted by at least one computing cooperation side.

Specifically, a computational-power sharing network element acquires the computational-power demand information of the computing demand side and the available computational-power information of the at least one computing cooperation side. The computational-power demand information includes a computation load required for a computing task, and may further include at least one of: an acceptable maximum computation time for completing the computing task, a maximum task parallelism N (specify up to N terminal devices to which the computing task is allocated for processing), an algorithm complexity of the computing task, or a specified captured data type. The specified captured data type is used to specify a data type that needs to be captured by the computing cooperation side during computing. For example, in a model training scenario, if the specified captured data type is speed, the computing cooperation side needs to capture a speed of the computing cooperation side during computing to assist the computing cooperation side in completing a local training task. The available computational-power information includes a computation load that the computing cooperation side can provide, and may further include at least one of: a time required for providing the above computation load, an acceptable maximum task parallelism, or an algorithm complexity that can be processed.

At 202, determine a computing cooperation side from the at least one computing cooperation side according to the computational-power demand information and the available computational-power information, and directly or indirectly indicate the computing cooperation side to complete the computing task of the computing demand side, where the computing cooperation side is able to provide computational power for the computing demand side.

Specifically, the number of computing cooperation sides that are able to provide computational power for the computing demand side can be greater than or equal to 1. The computational-power sharing network element can directly indicate the computing cooperation side that is able to provide computational power to complete the computing task of the computing demand side, and can also indirectly indicate the computing cooperation side that is able to provide computational power to complete the computing task of the computing demand side, to realize computational-power sharing of the computing cooperation side. As for indirect indication, the computational-power sharing network element can indicate the computing demand side or the computing cooperation sides to control the computing cooperation side that is able to provide computational power to complete the computing task of the computing demand side. By using the method in FIG. 2, the network no longer just serves as a communication channel but has a scheduling function, and the computational-power sharing network element can integratedly schedule the computing demand side and the computing cooperation sides, to realize computational-power sharing, thereby improving a computing speed, reducing a computation time required for the computing task, and improving computing efficiency. Furthermore, the method for computational-power sharing based on the computational-power sharing network element has relatively high trust.

Specially, for example, if the computational-power sharing network element directly indicates the computing cooperation side that is able to provide computational power to complete the computing task of the computing demand side, the computational-power sharing network element allocates the computing task to the computing cooperation side. After the computing cooperation side completes the task allocated, the computing cooperation side can acquire a sub-processing result of the computing task. The computational-power sharing network element with an information integration capacity can integrate the sub-processing result of the computing task to acquire a total processing result of the computing task. If the total processing result is not satisfied with a requirement, the computational-power sharing network element transmits to the computing cooperation side a new task to-be-processed, the computing cooperation side reprocesses the task until a total processing result is satisfied with a regulation, and then the computational-power sharing network element returns the total processing result to the computing demand side. Actually, if the computing demand side or the computing cooperation side has the information integration capacity, the computing demand side and the computing cooperation side can also replace the computational-power sharing network element to perform task allocation and information integration, to acquire the total processing result of the computing task. Similarly, if the computing demand side or the computational-power sharing network element has a computing capacity, the computing demand side or the computational-power sharing network element can be equivalent to a computing cooperation side and can also participate in computational-power sharing.

Figure 3:
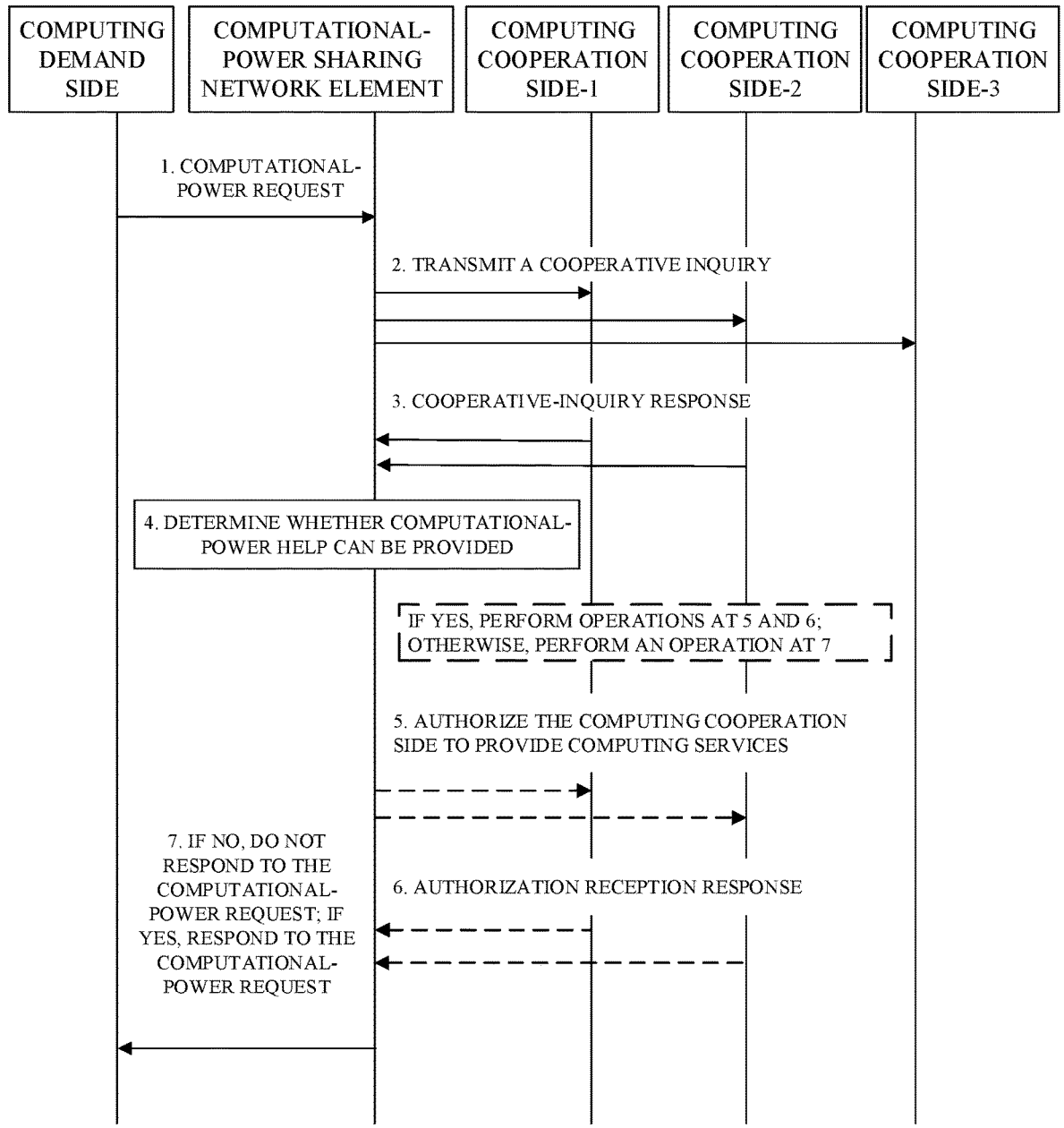
FIG. 3 is a schematic flow chart illustrating authorization application in a method for computational-power sharing provided in implementations of the disclosure.

In a possible implementation, referring to FIG. 3, FIG. 3 is a schematic flow chart illustrating authorization application in a method for computational-power sharing provided in implementations of the disclosure. The operations at 201 include the following.

At 301, receive a computational-power request transmitted by the computing demand side, where the computational-power request includes an ID and the computational-power demand information of the computing demand side, the computational-power request further includes participating computational-power information of the computing demand side if the computing demand side expects to participate in computational-power sharing, and the computational-power request further includes integration capacity information of the computing demand side if the computing demand side expects to perform task allocation and information integration on the computing task during computation-power sharing.

Specifically, the computational-power sharing network element receives the computational-power request transmitted by the computing demand side, where the computational-power request is required to include a unique ID of the computing demand side and the computational-power demand information. Whether the participating computational-power information or the integration capacity information is carried in the computational-power request is optional. If the computing demand side has excess computing power, the computing demand side can select to make the computational-power request carry the participating computational-power information, to indicate that the computing demand side expects to participate in computational-power sharing, and the computing demand side can also select not to carry the participating computational-power information. The participating computational-power information indicates a size of computational power that can be used by the computing demand side for computational-power sharing. The participating computational-power information may include a computation load that the computing demand side can provide, and may also include at least one of: a time required for providing the above computation load, an acceptable task parallelism, or an algorithm complexity that can be processed. If the computing demand side does not have excess computing power, the computing demand side can directly not to carry the participating computational-power information, or the participating computational-power information is replaced with "0". Similarly, if the computing demand side has the information integration capacity, the computing demand side can select to make the computational-power request carry the integration capacity information, to indicate that the computing demand side expects to perform task allocation and information integration on the computing task during computation-power sharing, and the computing demand side can also select not to carry the integration capacity information. The integration capacity information can be represented by "1" to indicate that the computing demand side has the information integration capacity. In the implementation, the computational-power demand information includes a required computation load, and may also include at least one of: an acceptable maximum computation time, a task parallelism, or an algorithm complexity.

Specially, for exciting computational-power sharing, the computational-power request can further carry subscription information, such as a price paid for the computational-power demand information, where the price may be cash, a computing capacity, or other valuable rewards.

At 302, transmit a cooperative inquiry to the at least one computing cooperation side, where the cooperative inquiry includes an available-computational-power reporting request. If the computational-power sharing network element is connected with the network to perform control plane transmission, and the computational-power sharing network element determines, according to the integration capacity information, that the computing demand side has no information integration capacity or the computing demand side does not transmit the integration capacity information of the computing demand side, the cooperative inquiry further includes an integration-capacity reporting request.

Specifically, after the computational-power sharing network element receives the computational-power request, the computational-power sharing network element transmits the cooperative inquiry to the at least one computing cooperation side (e.g., including computing cooperation side-1, computing cooperation side-2, and computing cooperation side-3) according to the computational-power request, where the cooperative inquiry includes the available-computational-power reporting request, such that the at least one computing cooperation side can return an ID and the available computational-power information of the at least one computing cooperation side according to the available-computational-power reporting request.

Specially, if the computational-power sharing network element determines, according to the integration capacity information, that the computing demand side has no information integration capacity or the integration capacity information of the computing demand side is not carried in the computational-power request, the cooperative inquiry further includes the integration-capacity reporting request, to request the at least one computing cooperation side to report the integration capacity information of the at least one computing cooperation side to the computational-power sharing network element.

Since information integration is performed at the computing demand side, information confidentiality of the computing task can be improved, and computing pressure of the computational-power sharing network element can also be reduced. Therefore, no matter whether the computational-power sharing network element has the information integration capacity, the computing cooperation side does not need to perform information integration if the computing demand side has the information integration capacity, i.e., the computing cooperation side does not need to report the integration capacity information of the computing cooperation side.

At 303, receive cooperative-inquiry response information returned in response to the cooperative inquiry by the at least one computing cooperation side (e.g., including computing cooperation side-1 and computing cooperation side-2), where the cooperative-inquiry response information includes the ID and the available computational-power information of the at least one computing cooperation side that are returned in response to the available-computational-power reporting request, and integration capacity information of the at least one computing cooperation side returned in response to the integration-capacity reporting request.

Specifically, if the at least one computing cooperation side has available computational power, respond to the available-computational-power reporting request to return the ID and the available computational-power information of the at least one computing cooperation side. If the at least one computing cooperation side has the information integration capacity, respond to the integration-capacity reporting request to return the integration capacity information of the computing cooperation side.

As can be seen, computational-power sharing can be initiated in response to the computational-power request initiated by the computing demand side, where the computing demand side actively initiates the computational-power request. Computational-power sharing is suitable for actual demand scenarios, and a demand party actively initiates a request.

Figure 4:
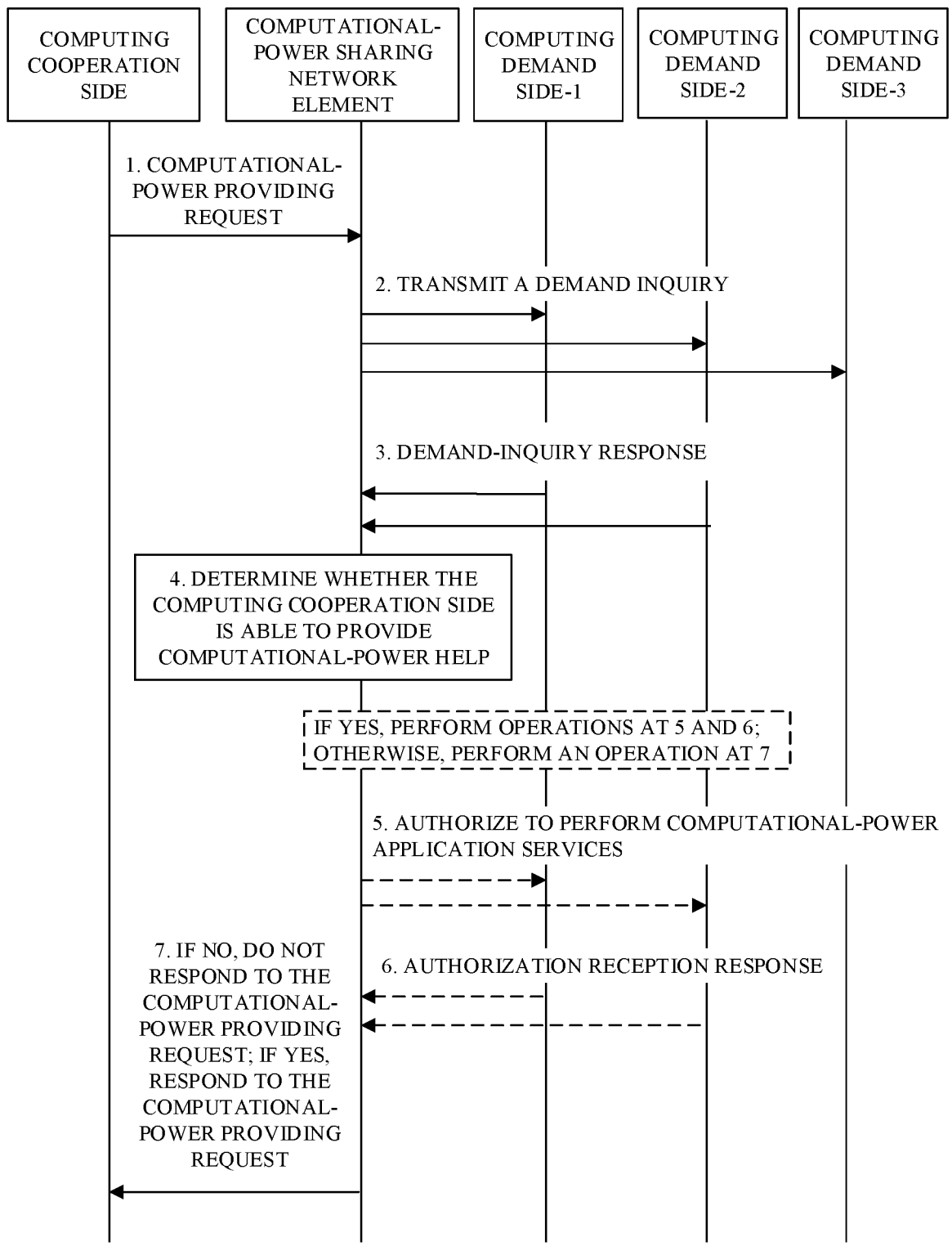
FIG. 4 is a schematic flow chart illustrating authorization application in a method for computational-power sharing provided in implementations of the disclosure.

In a possible implementation, referring to FIG. 4, FIG. 4 is a schematic flow chart illustrating authorization application in a method for computational-power sharing provided in implementations of the disclosure. The operations at 201 include the following.

At 401, receive a computational-power providing request transmitted by the at least one computing cooperation side, where the computational-power providing request includes an ID and the available computational-power information of the at least one computing cooperation side, and the computational-power providing request further includes integration capacity information if the at least one computing cooperation side expects to perform task allocation and information integration on the computing task during computational-power sharing.

Specifically, the computational-power sharing network element receives the computational-power providing request transmitted by the at least one computing cooperation side, where whether the integration capacity information is carried in the computational-power providing request is optional. If the at least one computing cooperation side has the information integration capacity, the at least one computing cooperation side can select to carry or not to carry the integration capacity information. If the at least one computing cooperation side expects to perform task allocation and information integration on the computing task during computational-power sharing, the at least one computing cooperation side makes the computational-power providing request carry the integration capacity information of the computing cooperation side.

At 402, transmit a demand inquiry to the computing demand side, where the demand inquiry includes a computational-power-demand reporting request, the demand inquiry further includes a computational-power reporting request if the computing demand side is expected to participate in computational-power sharing, and the demand inquiry further includes an integration-capacity reporting request if the computing demand side is expected to perform task allocation and information integration on the computing task during computational-power sharing.

Specifically, the computational-power sharing network element transmits the demand inquiry to the computing demand side (e.g., including computing demand side-1, computing demand side-2, and computing demand side-3) according to the computational-power providing request, where the demand inquiry includes the computational-power-demand reporting request. The demand inquiry further includes the computational-power reporting request if the computing demand side is expected to participate in computational-power sharing, and the demand inquiry further includes the integration-capacity reporting request if the computing demand side is expected to perform task allocation and information integration on the computing task during computational-power sharing. That is, whether to carry the computational-power reporting request or the integration-capacity reporting request is optional. The computational-power-demand reporting request is used to request the computing demand side to return the ID and the computational-power demand information of the computing demand side, the computational-power reporting request is used to request the computing demand side to return the participating computational-power information of the computing demand side, and the integration-capacity reporting request is used to request the computing demand side to return the integration capacity information of the computing demand side.

At 403, receive demand-inquiry response information returned in response to the demand inquiry by the computing demand side (e.g., including computing demand side-1 and computing demand side-2), where the demand-inquiry response information includes the ID and the computational-power demand information of the computing demand side that are returned in response to the computational-power-demand reporting request, participating computational-power information of the computing demand side returned in response to the computational-power reporting request, and integration capacity information of the computing demand side retuned in response to the integration-capacity reporting request.

Specifically, the computing demand side returns the ID and the computational-power demand information of the computing demand side in response to the computational-power-demand reporting request, and the computing demand side can also select not to respond to the computational-power-demand reporting request. The computing demand side returns the participating computational-power information of the computing demand side in response to the computational-power reporting request, and the computing demand side can also select not to respond to the computational-power reporting request. The computing demand side returns the integration capacity information of the computing demand side in response to the integration-capacity reporting request, and the computing demand side can also select not to respond to the integration-capacity reporting request.

As can be seen, by using the above method, the computational-power providing request is actively initiated by the computing cooperation side, to start computational-power sharing.

In a possible implementation, the operations at 202 include the following.

At 501, determine whether to provide computational power for the computing demand side, according to the computational-power demand information, participating computational-power information of the computational-power sharing network element, the participating computational-power information of the computing demand side, and the available computational-power information of the computing cooperation side. Specifically, if the participating computational-power information and the available computational-power information satisfy a computational-power demand determined according to the computational-power demand information, determine to provide computational power for the computing demand side and determine a first terminal device that is able to provide computational power for the computing demand side, where the first terminal device includes at least one of: the computational-power sharing network element, the computing demand side, or the computing cooperation side.

Specifically, referring to FIG. 3 and FIG. 4, the computational-power sharing network element determines whether to provide computational power for the computing demand side. That is, the computational-power sharing network element determines whether available computational power (computational power that the computational-power sharing network element can participate in, computational power that the computing cooperation side can provide, and computational power that the computing demand side can participate in) can satisfy the computational-power demand of the computing demand side, to provide computational-power help for the computing demand side. The participating computational-power information of the computational-power sharing network element may include a computation load that the computational-power sharing network element can provide, a time required for providing the above computation load, an acceptable maximum task parallelism, and an algorithm complexity that can be processed.

Therefore, the computational-power sharing network element determines whether the computational-power demand determined according to the computational-power demand information can be satisfied through matching the computational-power demand information, the participating computational-power information, and the available computational-power information.

For example, supposing that at a current time, the computational-power sharing network element receives computational-power demand information in which a required computation load is 20 megabits (M), an acceptable maximum computation time is 20 minutes, a task parallelism is 3, and taking a time complexity as an example of an algorithm complexity, the time complexity is O(n) that represents a data volume increases several times and a time consumption also increases several times.

A computation load that the computational-power sharing network element can provide is 1 M, a required time is 10 minutes, a task parallelism is 3, and an algorithm complexity is O(n). The participating computational-power information of the computing demand side received by the computational-power sharing network element includes the following: a computation load is 15 M, a required time is 5 minutes, a task parallelism is 3, and an algorithm complexity is O(n). As illustrated in Table 1, the available computational-power information of the computing cooperation side received by the computational-power sharing network element includes the following: for a first computing cooperation side, a computation load is 50 M, a required time is 20 minutes, a task parallelism is 3, and an algorithm complexity is O(n); for a second computing cooperation side, a computation load is 5 M, a required time is 20 minutes, a task parallelism is 2, and an algorithm complexity is O(n); and for a third computing cooperation side, a computation load is 15 M, a required time is 20 minutes, a task parallelism is 2, and an algorithm complexity is O(n).

TABLE 1

|  | computation load/M | required time/ minute | task parallelism | algorithm complexity |
|---|---|---|---|---|
| Computational-power sharing network element | 1 | 10 | 3 | O(n) |
| Computing demand side | 15 | 5 | 3 | O(n) |
| First computing cooperation side | 50 | 20 | 3 | O(n) |
| Second computing cooperation side | 5 | 20 | 2 | O(n) |
| Third computing cooperation side | 15 | 20 | 2 | O(n) |

By computing various possible computational-power sharing solutions that satisfy the computational-power demand, the computational-power sharing network element selects a solution from the various possible computational-power sharing solutions as a final computational-power sharing solution according to a preset selection condition. The preset selection condition may be that a task parallelism is maximum (i.e., a solution with a maximum number of terminal devices that are selected to participate in computational-power sharing), a task parallelism is minimum, a spent time is least, etc. A selection condition can be determined according to actual needs. For example, taking that a task parallelism is maximum as an example of the selection condition, two computational-power sharing solutions can be determined according to Table 1. In a first solution, the computational-power sharing network element, the computing demand side, and the first computing cooperation side provide computational power for the computing demand side. In a second solution, the second computing cooperation side and the third computing cooperation side provide computational power for the computing demand side. Three parties participate in computational-power sharing in the first solution, and only two parties participate in computational-power sharing in the second solution, therefore the first solution can be determined as the final computational-power sharing solution, and terminal devices that are able to provide computational power for the computing demand side can be determined, i.e., the first terminal device includes the computational-power sharing network element, the computing demand side, and the first computing cooperation side. However, supposing that a solution satisfying the requirement of the computational-power demand information cannot be acquired through computing according to Table 1, the computational-power sharing network element determines that computational-power help cannot be provided for the computing demand side, and thus does not respond to the computational-power request of the computing demand side or the computational-power providing request of the computing cooperation side.

At 502, if the computational-power sharing network element is connected with the network to perform control plane transmission and data plane transmission, determine a second terminal device for task allocation and information integration from the computational-power sharing network element, the computing demand side, and the computing cooperation side according to the integration capacity information of the computing demand side and the integration capacity information of the computing cooperation side; or if the computational-power sharing network element is connected with the network to perform control plane transmission, determine the second terminal device for task allocation and information integration from the computing demand side and the computing cooperation side according to the integration capacity information of the computing demand side and the integration capacity information of the computing cooperation side.

Specifically, after determining to provide computational power for the computing demand side according to the operations at 501, it needs to determine the second terminal device for task allocation and information integration during computational-power sharing according to the integration capacity information. If the computational-power sharing network element is connected with the network to perform control plane transmission and data plane transmission, i.e., the computational-power sharing network element has an information integration capacity, the computational-power sharing network element determines the second terminal device for task allocation and information integration from the computational-power sharing network element, the computing demand side, and the computing cooperation side according to the integration capacity information of the computing demand side and the integration capacity information of the computing cooperation side. If the integration capacity information of the computing demand side indicates that the computing demand side does not have the information integration capacity, the computational-power sharing network element is prioritized as the second terminal device. If the computational-power sharing network element cannot be assigned as the second terminal device due to reasons such as overload, a suitable computing cooperation side is selected as the second terminal device according to the integration capacity information of computing cooperation sides. However, if the computing demand side has the information integration capacity, a rule that the computing demand side is set to be prioritized as the second terminal device can be preset. Furthermore, for reducing a computation load of the computing demand side, the rule can also be that the computational-power sharing network element is set to be prioritized as the second terminal device, where selection can be performed according to actual conditions.

However, if the computational-power sharing network element is connected with the network to perform control plane transmission, i.e., the computational-power sharing network element does not have the information integration capacity, the computational-power sharing network element determines the second terminal device for task allocation and information integration from the computing demand side and the computing cooperation side according to the integration capacity information of the computing demand side and the integration capacity information of the computing cooperation side. Supposing that the computing demand side has the information integration capacity, the computing cooperation side does not report the integration capacity information, in this case, the second terminal device is the computing demand side. If the computing demand side does not have the information integration capacity, it needs to select one of computing cooperation sides (at least one) that have reported integration capacity information as the second terminal device. A computing cooperation side that reports integration capacity information at first can be selected as the second terminal device, and a more suitable computing cooperation side can also be selected as the second terminal device according to performances of the computing cooperation sides.

In a possible implementation, after the second terminal device for task allocation and information integration is determined, if the second terminal device is the computing demand side or the computing cooperation side, the method further includes the following.

At 601, perform computational-power scheduling according to the computational-power demand information and usable computational-power information of the first terminal device, to acquire a computational-power allocation list, where the computational-power allocation list contains a correspondence between the ID of the first terminal device and allocated computational power.

Specifically, the computational-power sharing network element performs computational-power scheduling according to the computational-power demand information and the usable computational-power information of the first terminal device, to acquire the computational-power allocation list. For example, if the computing task is a computation load of 20 M, and the first terminal device includes the computational-power sharing network element, the computing demand side, and the computing cooperation side, according to the usable computational-power information of the first terminal device, the computational-power sharing network element allocates a computation load of 2 M to the computational-power sharing network element, a computation load of 10 M to the computing demand side, and a computation load of 8 M to the computing cooperation side.

At 602, transmit the computational-power allocation list to the second terminal device, such that the second terminal device acquires the computing task transmitted by the computing demand side, allocates the computing task to the first terminal device according to the computational-power allocation list, receives the sub-processing result returned by the first terminal device, and integrates the sub-processing result to acquire the total processing result of the computing task.

Specifically, referring to FIG. 3, after the second terminal device is determined and the computational-power allocation list is acquired, for the computational-power request actively initiated by the computing demand side, the computational-power sharing network element authorizes the first terminal device (supposing that computing cooperation side-1 and computing cooperation side-2 are included) to provide computing services and transmits authorization information to the first terminal device. The authorization information includes the ID and the computational-power demand information of the computing demand side, and the authorization information further includes the subscription information if the computational-power request includes the subscription information. The first terminal device returns an ID of the first terminal device to the computational-power sharing network element as an authorization reception response.

In addition, if the second terminal device is not the computational-power sharing network element, the second terminal device is the computing demand side or the computing cooperation side, in this case, the second terminal device is further required to be authorized to provide integration services. If the computing cooperation side is assigned as the second terminal device, the authorization information includes the ID and the computational-power demand information of the computing demand side, and the computational-power allocation list. If the computing cooperation side is also assigned as the first terminal device, the computing cooperation side is authorized to provide computing services as well as integration services, where the authorization information includes the ID and the computational-power demand information of the computing demand side, and the computational-power allocation list. If the computing demand side is assigned as the second terminal device, the authorization information includes the computational-power allocation list. The computing cooperation side returns the ID of the computing cooperation side or the computing demand side returns the ID of the computing demand side to the computational-power sharing network element as the authorization reception response.

So far, the computational-power request of the computing demand side is processed. If computational-power help can be provided for the computing demand side, the computational-power sharing network element returns consent information to the computing demand side, where the consent information includes the ID of the first terminal device and the ID of the second terminal device. If the computing demand side is assigned as the second terminal device, the consent information is not required to include the ID of the second terminal device. If no computational-power help can be provided for the computing demand side, the computational-power sharing network element does not respond to the computational-power request.

Referring to FIG. 4, for the computational-power providing request initiated by the computing cooperation side, after the second terminal device is determined and the computational-power allocation list is allocated, the computational-power sharing network element authorizes the computing demand side to perform computational-power application services and transmits authorization information to the computing demand side, where the authorization information includes the ID of the second terminal device, and the ID and the usable computational-power information of the first terminal device. The first terminal device returns the ID of the first terminal device to the computational-power sharing network element as an authorization reception response.

In addition, if the second terminal device is not the computational-power sharing network element, the second terminal device is the computing demand side or the computing cooperation side, in this case, the second terminal device is further required to be authorized to provide integration services. If the computing cooperation side is assigned as the second terminal device, the authorization information includes the ID and the computational-power demand information of the computing demand side, and the computational-power allocation list. If the computing demand side is assigned as the second terminal device, the authorization information includes the computational-power allocation list. The computing cooperation side returns the ID of the computing cooperation side or the computing demand side returns the ID of the computing demand side to the computational-power sharing network element as the authorization reception response.

So far, the computational-power providing request of the computing cooperation side is processed. If computational-power help can be provided for the computing demand side, the computational-power sharing network element returns consent information to the computing cooperation side, where the consent information includes the ID of the computing demand side. If no computational-power help can be provided for the computing demand side, the computational-power sharing network element does not respond to the computational-power providing request.

After the authorization application is completed, the second terminal device acquires the computing task transmitted by the computing demand side, allocates the computing task to the first terminal device according to the computational-power allocation list, receives the sub-processing result returned by the first terminal device, integrates the sub-processing result to acquire the total processing result of the computing task, and returns the total processing result to the computing demand side.

Figure 5:
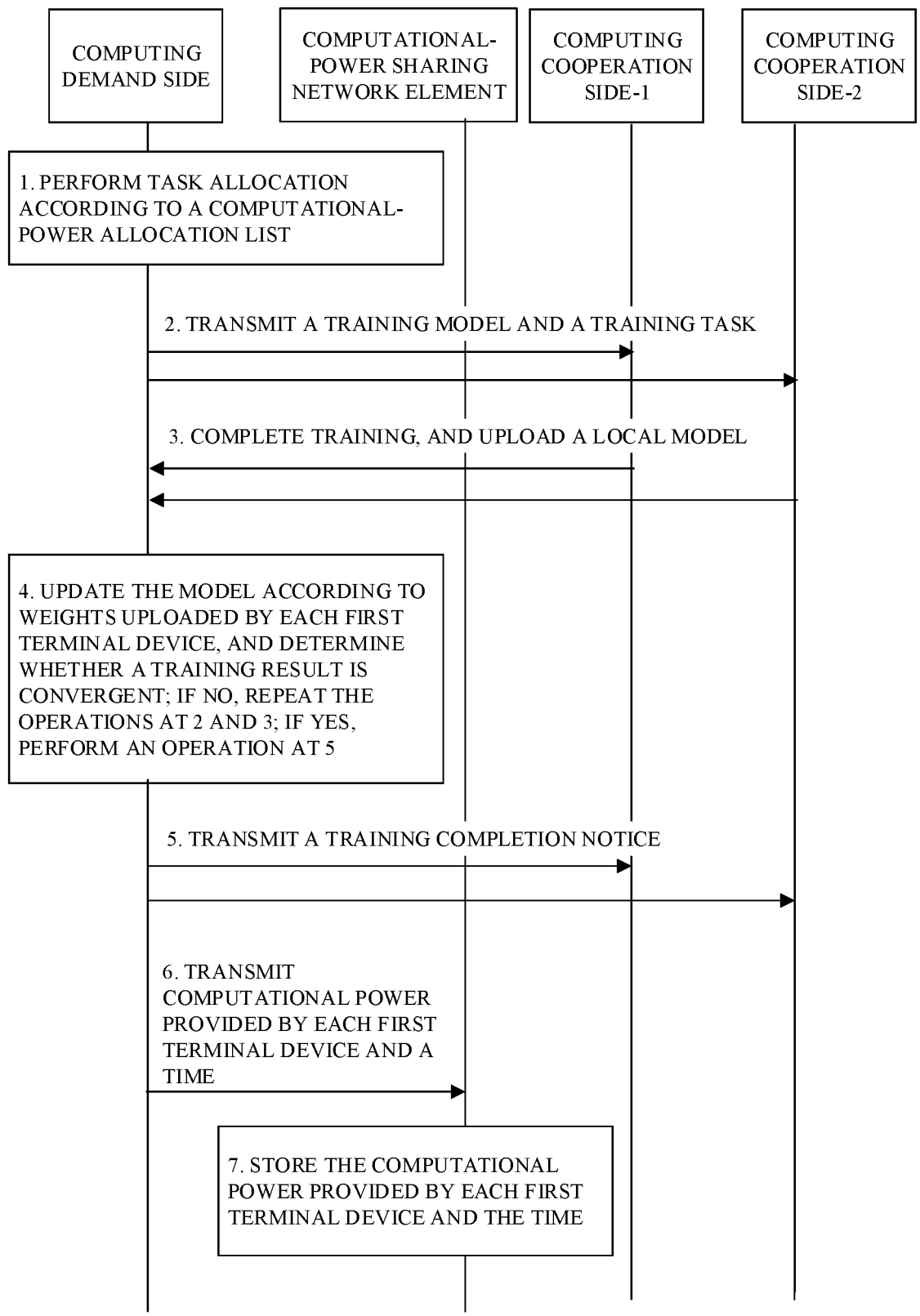
FIG. 5 is a schematic flow chart illustrating scheduling allocation in a method for computational-power sharing provided in implementations of the disclosure.

In a first case, the second terminal device is the computing demand side. Referring to FIG. 5, FIG. 5 is a schematic flow chart illustrating scheduling allocation in a method for computational-power sharing provided in implementations of the disclosure. In FIG. 5, a training model is taken as an example of the computing task. The computing demand side performs processing according to the training model and the computational-power allocation list, to complete task allocation. For example, the computing demand side transmits the training model and respective training tasks to computing cooperation side-1 and computing cooperation side-2. After computing cooperation side-1 and computing cooperation side-2 complete training, computing cooperation side-1 and computing cooperation side-2 upload sub-processing results such as local models to the computing demand side. After the computing demand side updates the training model according to weights uploaded by computing cooperation side-1 and computing cooperation side-2, the computing demand side determines whether a training result is convergent. If the training result is not convergent, computing cooperation side-1 and computing cooperation side-2 continue to perform training and upload sub-processing results until the training result is convergent. The computing demand side transmits a training completion notice to computing cooperation side-1 and computing cooperation side-2, and transmits to the computational-power sharing network element computational power provided by each first terminal device for the computing task and a time spent on the computing task by each first terminal device.

Figure 6:
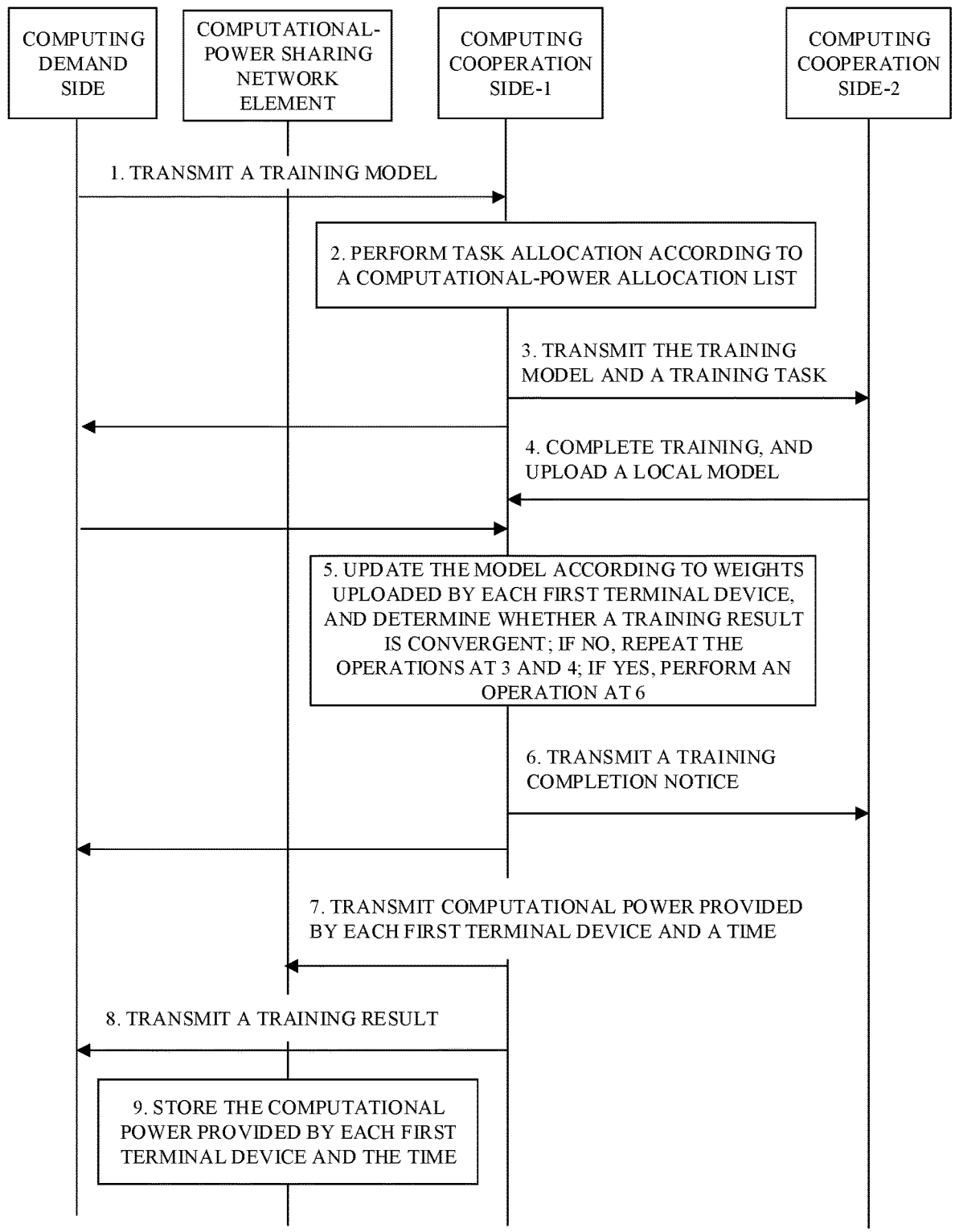
FIG. 6 is a schematic flow chart illustrating scheduling allocation in a method for computational-power sharing provided in implementations of the disclosure.

In a second case, the second terminal device is a certain computing cooperation side. Referring to FIG. 6, FIG. 6 is a schematic flow chart illustrating scheduling allocation in a method for computational-power sharing provided in implementations of the disclosure. In FIG. 6, the second terminal device is supposed as computing cooperation side-1. The computing demand side transmits the computing task to computing cooperation side-1, where a training model is taken as an example of the computing task. Computing cooperation side-1 performs processing according to the training model and the computational-power allocation list, to complete task allocation. For example, computing cooperation side-1 transmits the training model and respective training tasks to the computing demand side and computing cooperation side-2. After the computing demand side and computing cooperation side-2 complete training, the computing demand side and computing cooperation side-2 upload sub-processing results such as local models to computing cooperation side-1. After computing cooperation side-1 updates the training model according to weights uploaded by the computing demand side and computing cooperation side-2, computing cooperation side-1 determines whether a training result is convergent. If the training result is not convergent, the computing demand side and computing cooperation side-2 continue to perform training and upload sub-processing results until the training result is convergent. Computing cooperation side-1 transmits a training completion notice to the computing demand side and computing cooperation side-2, transmits to the computational-power sharing network element computational power provided by each first terminal device for the computing task and a time spent on the computing task by each first terminal device, and transmits the training result to the computing demand side, where the training result is a trained model.

The computational-power allocation list is acquired through scheduling in the computational-power sharing network element, to reduce a computation load of the second terminal device. In the above scheduling allocation, a training model scenario is taken as an example, and supposing that the computational-power demand information includes a data type to-be-captured, the first terminal device returns to the second terminal device data to-be-captured as part of the sub-processing result.

In particular, except the method that the second terminal device performs task allocation according to the computational-power allocation list, in a possible implementation, after the second terminal device for task allocation and information integration is determined, the method further includes the following.

At 701, transmit the ID and the usable computational-power information of the first terminal device to the second terminal device, such that the second terminal device acquires the computing task transmitted by the computing demand side, allocates the computing task to the first terminal device according to the usable computational-power information, receives a sub-processing result returned by the first terminal device, and integrates the sub-processing result to acquire a total processing result of the computing task.

Specifically, the usable computational-power information of the first terminal device includes at least one of: a computation load that the computational-power sharing network element can provide, a computation load that the computing demand side can provide, or a computation load that the computing cooperation side can provide. Since the computational-power sharing network element has IDs and computational-power information of all terminal devices, i.e., the computational-power sharing network element has the ID and the usable computational-power information of the first terminal device, the ID and the usable computational-power information of the first terminal device are not required to be transmitted to the second terminal device if the computational-power sharing network element is assigned as the second terminal device.

Figure 7:
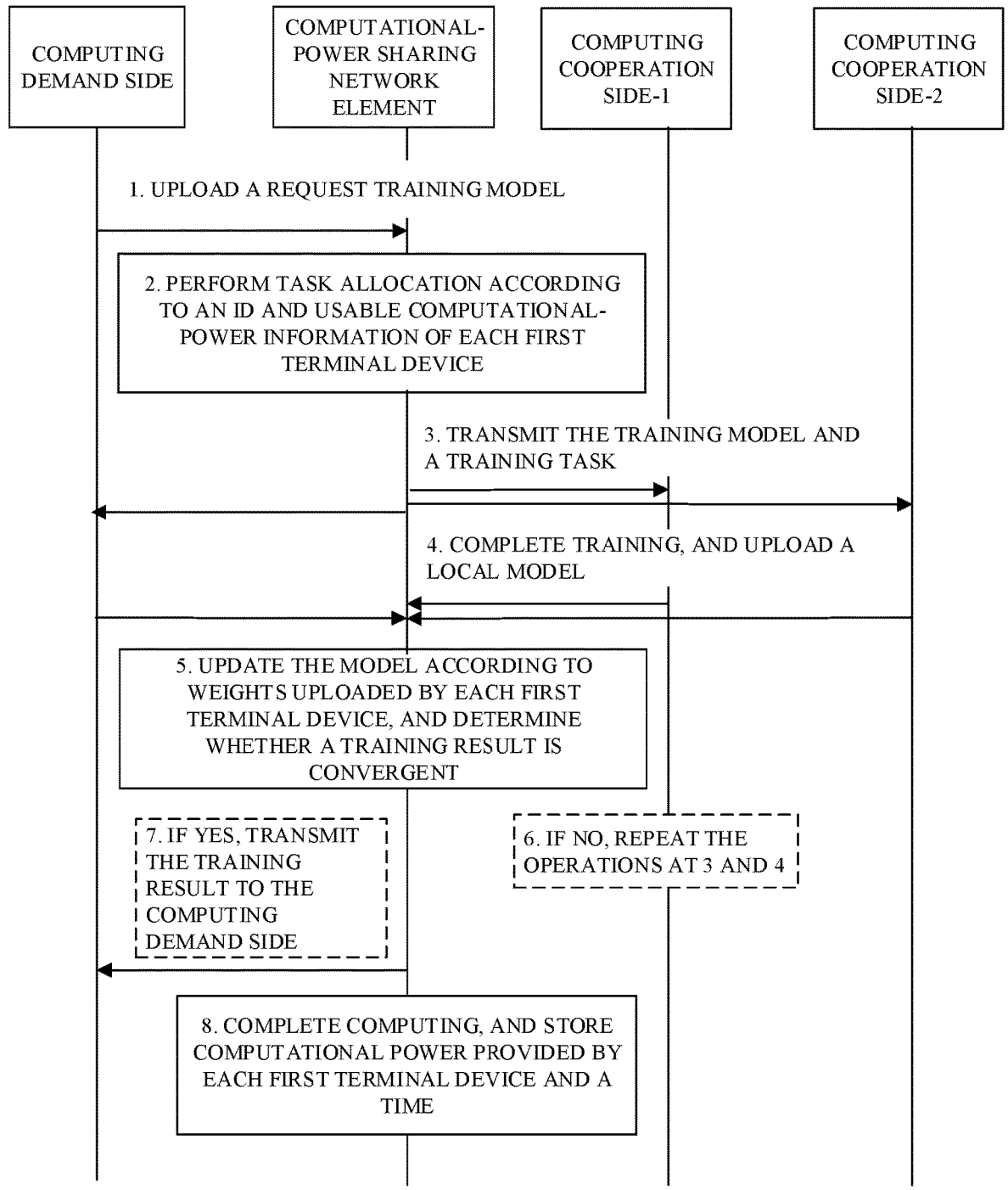
FIG. 7 is a schematic flow chart illustrating scheduling allocation in a method for computational-power sharing provided in implementations of the disclosure.

For example, the second terminal device is the computational-power sharing network element. Referring to FIG. 7, FIG. 7 is a schematic flow chart illustrating scheduling allocation in a method for computational-power sharing provided in implementations of the disclosure. The computing demand side transmits the computing task to the computational-power sharing network element. In FIG. 7, a training model is taken as an example of the computing task. The computational-power sharing network element performs processing according to the training model and the usable computational-power information of the first terminal device, to complete task allocation. For example, if a computation load required for the training model is 20 M, the first terminal device includes computing cooperation side-1 with usable computational-power information of 3 M and computing cooperation side-2 with usable computational-power information of 20 M, a task with a computation load of 2 M can be allocated to computing cooperation side-1 and a task with a computation load of 18 M can be allocated to computing cooperation side-2. The computational-power sharing network element allocates the training model and the respective training tasks to computing cooperation side-1 and computing cooperation side-2. After computing cooperation side-1 and computing cooperation side-2 complete training, computing cooperation side-1 and computing cooperation side-2 upload sub-processing results such as local models to the computational-power sharing network element. After the computational-power sharing network element updates the training model according to weights uploaded by computing cooperation side-1 and computing cooperation side-2, the computational-power sharing network element determines whether a training result is convergent. If the training result is not convergent, computing cooperation side-1 and computing cooperation side-2 continue to perform training and upload sub-processing results until the training result is convergent. The computational-power sharing network element transmits the training result to the computing demand side, where the training result is a trained model.

Referring to FIG. 5 and FIG. 6, if the second terminal device is the computing demand side or the computing cooperation side, a manner in which the ID and the usable computational-power information of the first terminal device are transmitted to the second terminal device is similar to the above manner in which the computational-power allocation list is transmitted, which is not repeated herein. After the computing demand side and the computing cooperation side receive the ID and the usable computational-power information of the first terminal device, the computing demand side and the computing cooperation side can perform task allocation and information integration according to the usable computational-power information.

In a possible implementation, the method for computational-power sharing further includes acquiring and storing a size of computational power provided by each first terminal device for the computing task and a time spent on the computing task by each first terminal device.

Specifically, the computational-power sharing network element acquires the size of computational power provided by the first terminal device for the computing task and the time spent on the computing task by the first terminal device. The second terminal device can start timing from a time when the task is transmitted to the first terminal device, and stop timing at a time when the sub-processing result returned by the first terminal device is received. If the computing task is only required to be executed once, the second terminal device can assign an acquired statistics time as the time spent on the computing task by the first terminal device, and assign a computation load that the first terminal device provides for completing the allocated task as the size of computational power provided by the first terminal device for the computing task. If the computing task is repeatedly executed X times, a sum of X statistics times is required to be assigned as the time spent on the computing task by the first terminal device, similarly, a sum of X computation loads is required to be assigned as the size of computational power provided by the first terminal device for the computing task. For example, if an operation at point 5 in FIG. 7 is required to be repeatedly executed, supposing that the operation at point 5 is repeatedly executed 3 times, a sum of 3 statistics times is required to be assigned as the time spent on the computing task by computing cooperation side-2, and a sum of 3 computation loads is required to be assigned as the size of total computational power provided by computing cooperation side-2 for the computing task.

Figure 8:
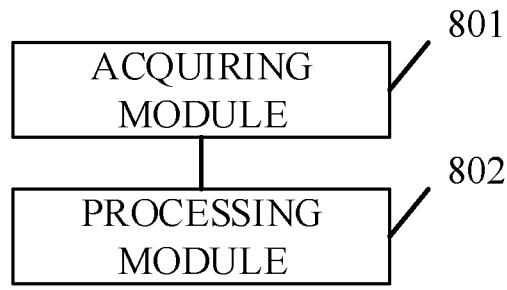
FIG. 8 is a schematic structural diagram illustrating a computational-power sharing network element provided in implementations of the disclosure.

Based on the above illustration of the implementations of the method for computational-power sharing, a computational-power sharing network element is further disclosed in implementations of the disclosure. Referring to FIG. 8, FIG. 8 is a schematic structural diagram illustrating a computational-power sharing network element provided in implementations of the disclosure. The computational-power sharing network element is connected with a network to perform control plane transmission and data plane transmission, or the computational-power sharing network element is connected with the network to perform control plane transmission. The computational-power sharing network element includes an acquiring module 801 and a processing module 802. The acquiring module 801 is configured to acquire computational-power demand information transmitted by a computing demand side and available computational-power information transmitted by at least one computing cooperation side. The processing module 802 is configured to determine a computing cooperation side from the at least one computing cooperation side according to the computational-power demand information and the available computational-power information, and directly or indirectly indicate the computing cooperation side to complete a computing task of the computing demand side, where the computing cooperation side is able to provide computational power for the computing demand side.

In a possible implementation, the network includes a core network. The computational-power sharing network element interacts with a UDM network element of the core network through a first reference point, the computational-power sharing network element interacts with an AMF network element of the core network through a second reference point, and the computational-power sharing network element interacts with a UPF network element of the core network through a third reference point. Alternatively, the computational-power sharing network element interacts with the UDM network element of the core network through the first reference point, and the computational-power sharing network element interacts with the AMF network element of the core network through the second reference point.

In a possible implementation, the acquiring module includes a first receiving sub-module and a first transmitting sub-module. The first receiving sub-module is configured to receive a computational-power request transmitted by the computing demand side, where the computational-power request includes an ID and the computational-power demand information of the computing demand side, the computational-power request further includes participating computational-power information of the computing demand side if the computing demand side expects to participate in computational-power sharing, and the computational-power request further includes integration capacity information of the computing demand side if the computing demand side expects to perform task allocation and information integration on the computing task during computation-power sharing. The first transmitting sub-module is configured to transmit a cooperative inquiry to the at least one computing cooperation side, where the cooperative inquiry includes an available-computational-power reporting request, if the computational-power sharing network element is connected with the network to perform control plane transmission, and the computational-power sharing network element determines, according to the integration capacity information, that the computing demand side has no information integration capacity or the computing demand side does not transmit the integration capacity information of the computing demand side, the cooperative inquiry further includes an integration-capacity reporting request. The first receiving sub-module is further configured to receive cooperative-inquiry response information returned in response to the cooperative inquiry by the at least one computing cooperation side, where the cooperative-inquiry response information includes an ID and the available computational-power information of the at least one computing cooperation side that are returned in response to the available-computational-power reporting request, and integration capacity information of the at least one computing cooperation side returned in response to the integration-capacity reporting request.

In another possible implementation, the acquiring module includes a second receiving sub-module and a second transmitting sub-module. The second receiving sub-module is configured to receive a computational-power providing request transmitted by the at least one computing cooperation side, where the computational-power providing request includes an ID and the available computational-power information of the at least one computing cooperation side, and the computational-power providing request further includes integration capacity information if the at least one computing cooperation side expects to perform task allocation and information integration on the computing task during computational-power sharing. The second transmitting sub-module is configured to transmit a demand inquiry to the computing demand side, where the demand inquiry includes a computational-power-demand reporting request, the demand inquiry further includes a computational-power reporting request if the computing demand side is expected to participate in computational-power sharing, and the demand inquiry further includes an integration-capacity reporting request if the computing demand side is expected to perform task allocation and information integration on the computing task during computational-power sharing. The second receiving sub-module is further configured to receive demand-inquiry response information returned in response to the demand inquiry by the computing demand side, where the demand-inquiry response information includes an ID and computational-power demand information of the computing demand side that are returned in response to the computational-power-demand reporting request, participating computational-power information of the computing demand side returned in response to the computational-power reporting request, and integration capacity information of the computing demand side retuned in response to the integration-capacity reporting request.

In a possible implementation, the processing module includes a first processing sub-module. The first processing sub-module is configured to determine whether to provide computational power for the computing demand side, according to the computational-power demand information, participating computational-power information of the computational-power sharing network element, the participating computational-power information of the computing demand side, and the available computational-power information of the at least one computing cooperation side. Specifically, if the participating computational-power information and the available computational-power information satisfy a computational-power demand determined according to the computational-power demand information, the first processing sub-module provides computational power for the computing demand side and determines a first terminal device that is able to provide computational power for the computing demand side, where the first terminal device includes at least one of: the computational-power sharing network element, the computing demand side, or the at least one computing cooperation side.

In a possible implementation, the processing module includes a second processing sub-module and a third processing sub-module. The second processing sub-module is configured to determine a second terminal device for task allocation and information integration from the computational-power sharing network element, the computing demand side, and the computing cooperation side according to the integration capacity information of the computing demand side and the integration capacity information of the computing cooperation side, if the computational-power sharing network element is connected with the network to perform control plane transmission and data plane transmission. Alternatively, the second processing sub-module is configured to determine the second terminal device for task allocation and information integration from the computing demand side and the computing cooperation side according to the integration capacity information of the computing demand side and the integration capacity information of the computing cooperation side, if the computational-power sharing network element is connected with the network to perform control plane transmission. The third processing sub-module is configured to transmit an ID and usable computational-power information of the first terminal device to the second terminal device, such that the second terminal device acquires the computing task transmitted by the computing demand side, allocates the computing task to the first terminal device according to the usable computational-power information, receives a sub-processing result returned by the first terminal device, and integrates the sub-processing result to acquire a total processing result of the computing task.

In a possible implementation, if the second terminal device is the computing demand side or the computing cooperation side, the processing module includes a fourth processing sub-module and a fifth processing sub-module. The fourth processing sub-module is configured to perform computational-power scheduling according to the computational-power demand information and the usable computational-power information of the first terminal device, to acquire a computational-power allocation list, where the computational-power allocation list contains a correspondence between the ID of the first terminal device and allocated computational power. The fifth processing sub-module is configured to transmit the computational-power allocation list to the second terminal device, such that the second terminal device acquires the computing task transmitted by the computing demand side, allocates the computing task to the first terminal device according to the computational-power allocation list, receives the sub-processing result returned by the first terminal device, and integrates the sub-processing result to acquire the total processing result of the computing task.

In a possible implementation, the computational-power sharing network element further includes a storage module. The storage module is configured to acquire and store a size of computational power provided by each first terminal device for the computing task and a time spent on the computing task by each first terminal device.

In a possible implementation, the computational-power demand information includes a computation load required for the computing task. The computational-power demand information further includes at least one of: an acceptable maximum computation time for completing the computing task, a maximum task parallelism, an algorithm complexity of the computing task, or a specified captured data type.

It is worth pointing out that, for implementation manners of specific functions of the computational-power sharing network element, reference can be made to the above illustration of the method for computational-power sharing, which is not repeated herein. Each unit or module in the computational-power sharing network element may be combined separately or entirely into one or several other units or modules, or a unit(s) or module(s) of each unit or module may be further split into multiple functionally smaller units or modules, which may implement the same operation without affecting the implementation of the technical effects of the implementations of the application. The above units or modules are divided based on logical functions. In practical applications, functions of a unit (or module) can also be implemented by multiple units (or modules), or functions of multiple units (or modules) can be implemented by one unit (or module).

Figure 9:
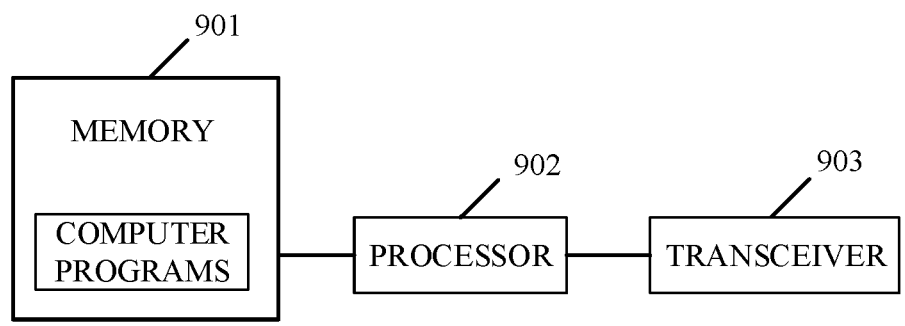
FIG. 9 is a schematic structural diagram illustrating a computational-power sharing network element provided in implementations of the disclosure.

Based on the illustration of the above method implementations, referring to FIG. 9, FIG. 9 is a schematic structural diagram illustrating a computational-power sharing network element provided in implementations of the disclosure. A computational-power sharing network element is further provided in implementations of the disclosure. The computational-power sharing network element includes a transceiver 903, a processor 902, a memory 901, and computer programs stored in the memory 901 and executed by the processor. The processor 902 coupled with the transceiver 903 and the memory 901 respectively is configured to execute the computer programs to implement the method for computational-power sharing.

The transceiver 903 may include a transceiver antenna, a network card, or various physical results with information transmitting and receiving functions. The memory 901 may include storage devices with various storage media. The processor 902 may be a central processor, a microprocessor, a digital signal processor, an application processor, a programmable array, an application specific integrated circuit (ASIC), or various processing devices. The processor 902 can be coupled with the transceiver 903 and the memory 901 through an integrated circuit bus. The processor 902 can execute the computer programs to implement the foregoing method for computational-power sharing. It can be understood that, the computational-power sharing network element illustrated in implementations of the disclosure can perform the above method for computational-power sharing, which is not repeated herein. In addition, illustration of an advantageous effect with the same method is also not repeated.

Figure 10:
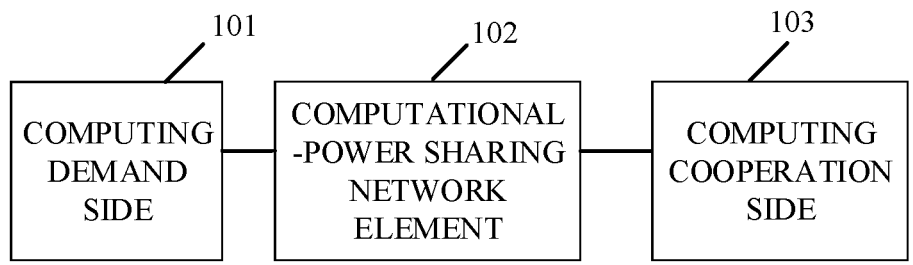
FIG. 10 is a schematic structural diagram illustrating a computational-power sharing system provided in implementations of the disclosure.

Based on the illustration of the above method implementations, referring to FIG. 10, FIG. 10 is a schematic structural diagram illustrating a computational-power sharing system provided in implementations of the disclosure. The computational-power sharing system includes a computing demand side 101, a computing cooperation side 103, and the above computational-power sharing network element 102.

In addition, it should be noted herein that, a computer storage medium is further provided in implementations of the disclosure. The computer storage medium is configured to store the above computer programs executed by the computational-power sharing network element, and the computer programs include program instructions which, when executed by a processor, are operable with the processor to perform the foregoing illustration of the method for computational-power sharing, which will not be repeated herein. In addition, illustration of an advantageous effect with the same method is also not repeated. For technical details undisclosed in the implementations of the computer storage medium involved in the disclosure, reference can be made to the illustration of the method implementations of the disclosure.

It will be understood by those of ordinary skill in the art that all or a part of the various methods of the implementations described above may be accomplished by means of computer programs to instruct associated hardware, and the programs may be stored in a computer-readable storage medium, and the programs when executed, may include the process of the implementations of the above various methods. The storage medium may include a magnetic disk, an optical disk, a read-only memory (ROM), a random access memory (RAM), etc.

The above implementations are merely a part implementations of this disclosure, of course, the above implementations cannot be used to limit the scope of the disclosure. Therefore, equivalent modification made according to the claims of the disclosure still belong to the scope of the disclosure covered.

What is claimed is:

1. A method for computational-power sharing, the method being applied to a computational-power sharing network element, the computational-power sharing network element being connected with a network to perform control plane transmission and data plane transmission, or the computational-power sharing network element being connected with the network to perform control plane transmission, the network comprising a core network, wherein the computational-power sharing network element interacts with a unified data management (UDM) network element of the core network through a first reference point, the computational-power sharing network element interacts with an access and mobility management function (AMF) network element of the core network through a second reference point, and the computational-power sharing network element interacts with a user plane function (UPF) network element of the core network through a third reference point or the computational-power sharing network element interacts with the UDM network element of the core network through the first reference point, and the computational-power sharing network element interacts with the AMF network element of the core network through the second reference point; wherein the method comprises:
   acquiring computational-power demand information transmitted by a computing demand side and available computational-power information transmitted by at least one computing cooperation side; and
   determining a computing cooperation side from the at least one computing cooperation side according to the computational-power demand information and the available computational-power information, and directly or indirectly indicating the computing cooperation side to complete a computing task of the computing demand side, wherein the computing cooperation side is able to provide computational power for the computing demand side.

2. The method of claim 1, wherein acquiring the computational-power demand information transmitted by the computing demand side and the available computational-power information transmitted by the at least one computing cooperation side comprises:
   receiving a computational-power request transmitted by the computing demand side, wherein the computational-power request comprises an identifier (ID) and the computational-power demand information of the computing demand side, the computational-power request further comprises participating computational-power information of the computing demand side based on that the computing demand side expects to participate in computational-power sharing, and the computational-power request further comprises integration capacity information of the computing demand side based on that the computing demand side expects to perform task allocation and information integration on the computing task during computation-power sharing;
   transmitting a cooperative inquiry to the at least one computing cooperation side, wherein the cooperative inquiry comprises an available-computational-power reporting request, based on that the computational-power sharing network element is connected with the network to perform control plane transmission, and the computational-power sharing network element determines, according to the integration capacity information, that the computing demand side has no information integration capacity or the computing demand side does not transmit the integration capacity information of the computing demand side, the cooperative inquiry further comprises an integration-capacity reporting request; and receiving cooperative-inquiry response information returned in response to the cooperative inquiry by the at least one computing cooperation side, wherein the cooperative-inquiry response information comprises an ID and the available computational-power information of the at least one computing cooperation side that are returned in response to the available-computational-power reporting request, and integration capacity information of the at least one computing cooperation side returned in response to the integration-capacity reporting request.

3. The method of claim 2, wherein determining the computing cooperation side according to the computational-power demand information and the available computational-power information comprises:

determining whether to provide computational power for the computing demand side, according to the computational-power demand information, participating computational-power information of the computational-power sharing network element, the participating computational-power information of the computing demand side, and the available computational-power information of the at least one computing cooperation side; and based on that the participating computational-power information and the available computational-power information satisfy a computational-power demand determined according to the computational-power demand information, determining to provide computational power for the computing demand side and determining a first terminal device that is able to provide computational power for the computing demand side, wherein the first terminal device comprises at least one of: the computational-power sharing network element, the computing demand side, or the at least one computing cooperation side.

4. The method of claim 3, wherein directly or indirectly indicating the computing cooperation side to complete the computing task of the computing demand side comprises:

based on that the computational-power sharing network element is connected with the network to perform control plane transmission and data plane transmission, determining a second terminal device for task allocation and information integration from the computational-power sharing network element, the computing demand side, and the computing cooperation side according to the integration capacity information of the computing demand side and the integration capacity information of the computing cooperation side; or based on that the computational-power sharing network element is connected with the network to perform control plane transmission, determining the second terminal device for task allocation and information integration from the computing demand side and the computing cooperation side according to the integration capacity information of the computing demand side and the integration capacity information of the computing cooperation side; and transmitting an ID and usable computational-power information of the first terminal device to the second terminal device, such that the second terminal device acquires the computing task transmitted by the computing demand side, allocates the computing task to the first terminal device according to the usable computational-power information, receives a sub-processing result returned by the first terminal device, and integrates the sub-processing result to acquire a total processing result of the computing task.

5. The method of claim 4, wherein after the second terminal device for task allocation and information integration is determined, based on that the second terminal device is the computing demand side or the computing cooperation side, the method further comprises:

performing computational-power scheduling according to the computational-power demand information and the usable computational-power information of the first terminal device, to acquire a computational-power allocation list, wherein the computational-power allocation list contains a correspondence between the ID of the first terminal device and allocated computational power; and transmitting the computational-power allocation list to the second terminal device, such that the second terminal device acquires the computing task transmitted by the computing demand side, allocates the computing task to the first terminal device according to the computational-power allocation list, receives the sub-processing result returned by the first terminal device, and integrates the sub-processing result to acquire the total processing result of the computing task.

6. The method of claim 4, further comprising:

acquiring and storing a size of computational power provided by each first terminal device for the computing task and a time spent on the computing task by each first terminal device.

7. The method of claim 1, wherein acquiring the computational-power demand information transmitted by the computing demand side and the available computational-power information transmitted by the at least one computing cooperation side comprises:

receiving a computational-power providing request transmitted by the at least one computing cooperation side, wherein the computational-power providing request comprises an ID and the available computational-power information of the at least one computing cooperation side, and the computational-power providing request further comprises integration capacity information based on that the at least one computing cooperation side expects to perform task allocation and information integration on the computing task during computational-power sharing;

transmitting a demand inquiry to the computing demand side, wherein the demand inquiry comprises a computational-power-demand reporting request, the demand inquiry further comprises a computational-power reporting request based on that the computing demand side is expected to participate in computational-power sharing, and the demand inquiry further comprises an integration-capacity reporting request based on that the computing demand side is expected to perform task allocation and information integration on the computing task during computational-power sharing; and receiving demand-inquiry response information returned in response to the demand inquiry by the computing demand side, wherein the demand-inquiry response information comprises an ID and computational-power demand information of the computing demand side that are returned in response to the computational-power-demand reporting request, participating computational-power information of the computing demand side returned in response to the computational-power reporting request, and integration capacity information of the computing demand side retuned in response to the integration-capacity reporting request.

8. The method of claim 1, wherein the computational-power demand information comprises a computation load required for the computing task.

9. The method of claim 8, wherein the computational-power demand information further comprises at least one of: an acceptable maximum computation time for completing the computing task, a maximum task parallelism, an algorithm complexity of the computing task, or a specified captured data type.

10. A computational-power sharing network element, the computational-power sharing network element being connected with a network to perform control plane transmission and data plane transmission, or the computational-power sharing network element being connected with the network to perform control plane transmission, and the computational-power sharing network element comprising:
a transceiver;
a processor; and
a memory storing computer programs which, when executed by the processor, cause the transceiver to:
acquire computational-power demand information transmitted by a computing demand side and available computational-power information transmitted by at least one computing cooperation side; and
the computer programs being further executed by the processor to cause the processor to:
determine a computing cooperation side from the at least one computing cooperation side according to the computational-power demand information and the available computational-power information, and directly or indirectly indicate the computing cooperation side to complete a computing task of the computing demand side, wherein the computing cooperation side is able to provide computational power for the computing demand side;
wherein
the network comprises a core network, wherein
the computational-power sharing network element interacts with a unified data management (UDM) network element of the core network through a first reference point, the computational-power sharing network element interacts with an access and mobility management function (AMF) network element of the core network through a second reference point, and the computational-power sharing network element interacts with a user plane function (UPF) network element of the core network through a third reference point; or
the computational-power sharing network element interacts with the UDM network element of the core network through the first reference point, and the computational-power sharing network element interacts with the AMF network element of the core network through the second reference point.

11. The computational-power sharing network element of claim 10, wherein the computer programs executed by the processor to cause the transceiver to acquire the computational-power demand information transmitted by the computing demand side and the available computational-power information transmitted by the at least one computing cooperation side cause the transceiver to:
receive a computational-power request transmitted by the computing demand side, wherein the computational-power request comprises an identifier (ID) and the computational-power demand information of the computing demand side, the computational-power request further comprises participating computational-power information of the computing demand side based on that the computing demand side expects to participate in computational-power sharing, and the computational-power request further comprises integration capacity information of the computing demand side based on that the computing demand side expects to perform task allocation and information integration on the computing task during computation-power sharing;
transmit a cooperative inquiry to the at least one computing cooperation side, wherein the cooperative inquiry comprises an available-computational-power reporting request, based on that the computational-power sharing network element is connected with the network to perform control plane transmission, and the computational-power sharing network element determines, according to the integration capacity information, that the computing demand side has no information integration capacity or the computing demand side does not transmit the integration capacity information of the computing demand side, the cooperative inquiry further comprises an integration-capacity reporting request; and
receive cooperative-inquiry response information returned in response to the cooperative inquiry by the at least one computing cooperation side, wherein the cooperative-inquiry response information comprises an ID and the available computational-power information of the at least one computing cooperation side that are returned in response to the available-computational-power reporting request, and integration capacity information of the at least one computing cooperation side returned in response to the integration-capacity reporting request.

12. The computational-power sharing network element of claim 11, wherein the computer programs executed by the processor to cause the processor to determine the computing cooperation side according to the computational-power demand information and the available computational-power information cause the processor to:
determine whether to provide computational power for the computing demand side, according to the computational-power demand information, participating computational-power information of the computational-power sharing network element, the participating computational-power information of the computing demand side, and the available computational-power information of the at least one computing cooperation side; and
based on that the participating computational-power information and the available computational-power information satisfy a computational-power demand determined according to the computational-power demand information, determine to provide computational power for the computing demand side and determine a first terminal device that is able to provide computational power for the computing demand side, wherein the first terminal device comprises at least one of: the computational-power sharing network element, the computing demand side, or the at least one computing cooperation side.

13. The computational-power sharing network element of claim 12, wherein the computer programs executed by the processor to cause the processor to directly or indirectly indicate the computing cooperation side to complete the computing task of the computing demand side cause the processor to:
based on that the computational-power sharing network element is connected with the network to perform control plane transmission and data plane transmission, determine a second terminal device for task allocation and information integration from the computational-power sharing network element, the computing demand side, and the computing cooperation side according to the integration capacity information of the computing demand side and the integration capacity information of the computing cooperation side; or based on that the computational-power sharing network element is connected with the network to perform control plane transmission, determine the second terminal device for task allocation and information integration from the computing demand side and the computing cooperation side according to the integration capacity information of the computing demand side and the integration capacity information of the computing cooperation side; and
the computer programs are further executed by the processor to cause the transceiver to transmit an ID and usable computational-power information of the first terminal device to the second terminal device, such that the second terminal device acquires the computing task transmitted by the computing demand side, allocates the computing task to the first terminal device according to the usable computational-power information, receives a sub-processing result returned by the first terminal device, and integrates the sub-processing result to acquire a total processing result of the computing task.

14. The computational-power sharing network element of claim 13, wherein after the second terminal device for task allocation and information integration is determined, based on that the second terminal device is the computing demand side or the computing cooperation side, the computer programs are further executed by the processor to cause the processor to:
perform computational-power scheduling according to the computational-power demand information and the usable computational-power information of the first terminal device, to acquire a computational-power allocation list, wherein the computational-power allocation list contains a correspondence between the ID of the first terminal device and allocated computational power; and
the computer programs are further executed by the processor to cause the transceiver to transmit the computational-power allocation list to the second terminal device, such that the second terminal device acquires the computing task transmitted by the computing demand side, allocates the computing task to the first terminal device according to the computational-power allocation list, receives the sub-processing result returned by the first terminal device, and integrates the sub-processing result to acquire the total processing result of the computing task.

15. The computational-power sharing network element of claim 10, wherein the computer programs executed by the processor to cause the transceiver to acquire the computational-power demand information transmitted by the computing demand side and the available computational-power information transmitted by the at least one computing cooperation side cause the transceiver to:
receive a computational-power providing request transmitted by the at least one computing cooperation side, wherein the computational-power providing request comprises an ID and the available computational-power information of the at least one computing cooperation side, and the computational-power providing request further comprises integration capacity information based on that the at least one computing cooperation side expects to perform task allocation and information integration on the computing task during computational-power sharing;
transmit a demand inquiry to the computing demand side, wherein the demand inquiry comprises a computational-power-demand reporting request, the demand inquiry further comprises a computational-power reporting request based on that the computing demand side is expected to participate in computational-power sharing, and the demand inquiry further comprises an integration-capacity reporting request based on that the computing demand side is expected to perform task allocation and information integration on the computing task during computational-power sharing; and
receive demand-inquiry response information returned in response to the demand inquiry by the computing demand side, wherein the demand-inquiry response information comprises an ID and computational-power demand information of the computing demand side that are returned in response to the computational-power-demand reporting request, participating computational-power information of the computing demand side returned in response to the computational-power reporting request, and integration capacity information of the computing demand side retuned in response to the integration-capacity reporting request.

16. The computational-power sharing network element of claim 10, wherein the computational-power demand information comprises a computation load required for the computing task.

17. The computational-power sharing network element of claim 16, wherein the computational-power demand information further comprises at least one of: an acceptable maximum computation time for completing the computing task, a maximum task parallelism, an algorithm complexity of the computing task, or a specified captured data type.

18. A non-transitory computer storage medium configured to store computer programs, the computer programs being executed by a computational-power sharing network element, the computational-power sharing network element being connected with a network to perform control plane transmission and data plane transmission, or the computational-power sharing network element being connected with the network to perform control plane transmission, the network comprising a core network, wherein the computational-power sharing network element interacts with a unified data management (UDM) network element of the core network through a first reference point, the computational-power sharing network element interacts with an access and mobility management function (AMF) network element of the core network through a second reference point, and the computational-power sharing network element interacts with a user plane function (UPF) network element of the core network through a third reference point or the computational-power sharing network element interacts with the UDM network element of the core network through the first reference point, and the computational-power sharing network element interacts with the AMF network element of the core network through the second reference point; wherein the computer programs are executed by the computational-power sharing network element to:

acquire computational-power demand information transmitted by a computing demand side and available computational-power information transmitted by at least one computing cooperation side; and determine a computing cooperation side from the at least one computing cooperation side according to the computational-power demand information and the available computational-power information, and directly or indirectly indicating the computing cooperation side to complete a computing task of the computing demand side, wherein the computing cooperation side is able to provide computational power for the computing demand side.

* * * * *